US011134377B2

(12) United States Patent
Song

(10) Patent No.: US 11,134,377 B2
(45) Date of Patent: Sep. 28, 2021

(54) ENCRYPTING/DECRYPTING DATA ON MOBILE TERMINAL

(71) Applicant: Advanced New Technologies Co., Ltd, Grand Cayman (KY)

(72) Inventor: Yitao Song, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 29 days.

(21) Appl. No.: 15/601,531

(22) Filed: May 22, 2017

(65) Prior Publication Data
US 2017/0264435 A1  Sep. 14, 2017

Related U.S. Application Data

(63) Continuation of application No. PCT/CN2015/095588, filed on Nov. 26, 2015.

(30) Foreign Application Priority Data

Dec. 2, 2014  (CN) .......................... 201410721298.5

(51) Int. Cl.
H04W 12/033 (2021.01)
H04W 88/02 (2009.01)
(Continued)

(52) U.S. Cl.
CPC ......... H04W 12/033 (2021.01); H04L 9/0822 (2013.01); H04L 9/0861 (2013.01);
(Continued)

(58) Field of Classification Search
CPC ....... H04L 9/0861; H04L 9/0822; H04L 9/14; H04L 9/3236; H04L 63/0442; H04W 12/02; H04W 12/04; H04W 88/02
(Continued)

(56) References Cited

U.S. PATENT DOCUMENTS 7,610,380 B2 * 10/2009 Igarashi ............ H04L 29/12783
                                                    709/226
8,433,901 B2 *  4/2013 De Atley .............. G06F 21/575
                                                    713/165
(Continued)

FOREIGN PATENT DOCUMENTS

CN        1607511 A       4/2005
CN        1780413         5/2006
(Continued)

OTHER PUBLICATIONS

Translation of Chinese Office Action from corresponding Chinese Patent Application No. 2014107212985, dated Aug. 16, 2018, 9 pages.
(Continued)

Primary Examiner — Mohammad W Reza
Assistant Examiner — Moeen Khan
(74) Attorney, Agent, or Firm — Lee & Hayes, P.C.

(57) ABSTRACT

A method includes: pre-generating a key pair including a first public key and a first private key; acquiring identification information about a mobile terminal; encrypting the key pair including the first public key and the first private key using the identification information to obtain a first encrypted public key and a first encrypted private key and saving same; when a service key is encrypted, encrypting the service key using the first private key to obtain an encrypted service key; when the service key is decrypted, decrypting the encrypted service key using the first public key to obtain the service key; acquiring data needing to be encrypted/decrypted of the mobile terminal; and encrypting/decrypting the data using the service key. The security of the data can be protected off-line with low cost and without hardware protection, so that the data cannot be intercepted and tampered with.

4 Claims, 2 Drawing Sheets

(51) Int. Cl.
*H04W 12/041* (2021.01)
*H04L 9/08* (2006.01)
*H04L 9/14* (2006.01)
*H04L 9/32* (2006.01)
*H04L 29/06* (2006.01)

(52) U.S. Cl.
CPC ............. *H04L 9/14* (2013.01); *H04L 9/3236* (2013.01); *H04W 12/041* (2021.01); *H04W 88/02* (2013.01); *H04L 63/0442* (2013.01)

(58) Field of Classification Search
USPC ........................................................ 713/193
See application file for complete search history.

(56) References Cited

U.S. PATENT DOCUMENTS

| | | | | |
|---|---|---|---|---|
| 9,641,344 | B1* | 5/2017 | Kim | H04L 9/3268 |
| 2003/0217037 | A1* | 11/2003 | Bicker | G06F 21/6254 |
| 2004/0039911 | A1* | 2/2004 | Oka | G06Q 30/06 |
| | | | | 713/175 |
| 2004/0187018 | A1* | 9/2004 | Owen | H04L 9/321 |
| | | | | 713/184 |
| 2008/0148067 | A1* | 6/2008 | Sitrick | H04L 9/0861 |
| | | | | 713/193 |
| 2009/0147958 | A1* | 6/2009 | Calcaterra | H04L 9/0833 |
| | | | | 380/260 |
| 2010/0043061 | A1* | 2/2010 | Martin | G06Q 20/3574 |
| | | | | 726/4 |
| 2010/0257360 | A1* | 10/2010 | Bae | H04L 9/0866 |
| | | | | 713/168 |
| 2011/0252236 | A1 | 10/2011 | De Atley et al. | |
| 2014/0281506 | A1* | 9/2014 | Redberg | H04L 63/067 |
| | | | | 713/159 |
| 2015/0039883 | A1* | 2/2015 | Yoon | H04L 9/0847 |
| | | | | 713/155 |
| 2015/0086016 | A1* | 3/2015 | Oshida | H04L 9/3239 |
| | | | | 380/255 |
| 2015/0363775 | A1* | 12/2015 | Li | H04W 12/04 |
| | | | | 705/71 |
| 2015/0370704 | A1* | 12/2015 | Kato | G06F 12/0638 |
| | | | | 713/193 |

FOREIGN PATENT DOCUMENTS

| | | |
|---|---|---|
| CN | 100403814 A | 5/2006 |
| CN | 101335579 | 12/2008 |
| CN | 101478595 A | 7/2009 |
| CN | 101711028 A | 5/2010 |
| CN | 101778381 A | 7/2010 |
| CN | 101977299 | 2/2011 |
| CN | 102170357 | 8/2011 |
| EP | 1469692 | 10/2004 |
| JP | 2000056681 | 2/2000 |
| JP | 2002016592 | 1/2002 |
| JP | WO03034651 | 4/2003 |
| JP | 2006301887 | 11/2006 |
| JP | 2009098889 | 5/2009 |
| KR | 20090048682 | 5/2009 |
| WO | WO2009064069 | 5/2009 |

OTHER PUBLICATIONS

Translation of Chinese Search Report from corresponding Chinese Patent Application No. 2014107212985, dated Aug. 2, 2018, 2 pages.
The Extended European Search Report dated Nov. 14, 2018 for European Patent Application No. 15866319.5, 9 pages.
Apple Inc., "iOS Security", Oct. 1, 2012, Retrieved from the Internet: URL: https://safetyculture.com/files/it-jargon/ios security.pdf, 21 pages.
The European Search Report dated May 24, 2018 for European Application No. 15866319.5, 7 pages.
Teufl, et. al., "iOS Encryption System: Deploying iOS devices in security-critical environments", 2013 International Conference on Security and Cryptography (SECRYPT), SCITEPRESS, Jul. 29, 2013 (Jul. 29, 2013), pp. 1-13.
Translation of International Search Report from corresponding PCT application No. PCT/CN2015/095588 dated Feb. 16, 2016, 2 pages.
Translation of Written Opinion from corresponding PCT application No. PCT/CN2015/095588 dated Feb. 16, 2016, 6 pages.
Translation of Office Action from Chinese Patent Application No. 201410721298.5, dated Mar. 5, 2019, 5 pages.
The Japanese Office Action dated Feb. 19, 2019 for Japanese Patent Application No. 2017-529311, a counterpart of U.S. Appl. No. 15/601,531, 4 pages.
The European Office Action dated Nov. 26, 2019, for European Patent Application No. 15866319.5, a counterpart of the U.S. Appl. No. 15/601,531, 8 pages.
Wikipedia, "Hybrid Cryptosystem", Retrieved on Oct. 25, 2019 for: https://en.wi ki pedia.org/w/i ndex.php?title=Hybrid_cryptosystem &old id =608171294, 2 pages.
The Korean Office Action dated Apr. 23, 2019 for Korean Patent Application No. 2017-7014346, a counterpart of U.S. Appl. No. 15/601,531, 5 pages.
The European Office Action dated Jun. 4, 2019 for European Patent Application No. 15866319.5, a counter part of U.S. Appl. No. 15/601,531, 5 pages.
The European Office Action dated Jul. 20, 2020 for the European Patent Application No. 15866319.5, a counterpart foreign application of the U.S. Appl. No. 15/601,531, 7 pages.
The Singapore Search Report and Written Opinion dated Aug. 6, 2020 for Singapore Patent Application No. 10201904754U, 8 pages.
The Indian Office Action dated Mar. 17, 2020 for Indian Patent Application No. 201717017767, a counterpart of U.S. Appl. No. 15/601,531, 5 pages.

\* cited by examiner

ENCRYPTING/DECRYPTING DATA ON MOBILE TERMINAL

CROSS REFERENCE TO RELATED PATENT APPLICATIONS

This application claims priority to and is a continuation of PCT Patent Application No. PCT/CN2015/095588, filed on 26 Nov. 2015, which claims priority to Chinese Patent Application No. 201410721298.5, filed on 2 Dec. 2014, entitled "METHOD AND APPARATUS FOR ENCRYPTING/DECRYPTING DATA ON MOBILE TERMINAL," which are hereby incorporated by reference in their entirety.

TECHNICAL FIELD

The present disclosure relates to the field of data processing, and in particular, to a method and an apparatus for encrypting/decrypting data on a mobile terminal.

BACKGROUND

With the development of mobile communications and network technologies, people gradually develop a habit of accessing the Internet by using mobile terminals (such as mobile phones and tablet computers). Therefore, a lot of private data, including a unique identifier of a mobile phone device and some key service data, needs to be saved on a mobile terminal. Such data needs to be securely stored on the mobile terminal, and therefore, a secure data encryption method is needed to ensure that the private data will not be stolen or tampered with.

In the conventional techniques, data on a mobile terminal is protected by means of hardware protection or public and private key protection. The hardware protection is generally a method of using an encryption card or a mobile phone shield as a carrier for protecting private data on the mobile terminal, to store the private data in plain text. For example, key seeds are integrated in a central processor by using a certificate shield of a bank, to encrypt and decrypt data. To protect data on the mobile terminal by using public and private keys, the data needs to be encrypted by using keys exchanged on a network.

The method of protecting data on a mobile terminal by using hardware protection is expensive, and is not suitable for promotion and popularization among the public. When data on a mobile terminal is protected by using public and private keys, data needs to be decrypted on a server, which can be implemented only in the case of a network connection, and cannot be used in an offline state.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to provide a method and an apparatus for encrypting/decrypting data on a mobile terminal, which can protect the data in an offline state without hardware protection, so that the data will not be stolen or tampered with.

According to an aspect, the present disclosure provides a method for encrypting/decrypting data on a mobile terminal, including generating a service key, and encrypting/decrypting the service key, which includes:

generating a key pair including a first public key and a first private key in advance;

acquiring identification information of the mobile terminal;

encrypting the key pair including the first public key and the first private key by using the identification information, to obtain a first encrypted public key and a first encrypted private key and save them;

acquiring the identification information of the mobile terminal during encryption of the service key;

decrypting the first encrypted private key by using the identification information, to obtain the first private key;

encrypting the service key by using the first private key, to obtain an encrypted service key;

acquiring the identification information of the mobile terminal during decryption of the service key;

decrypting the first encrypted public key by using the identification information, to obtain the first public key;

decrypting the encrypted service key by using the first public key, to obtain the service key;

acquiring data that needs to be encrypted/decrypted on the mobile terminal; and encrypting/decrypting the data by using the service key.

According to an aspect, the present disclosure provides an apparatus for encrypting/decrypting data on a mobile terminal, including:

a first generation unit configured to generate a service key;

a second generation unit configured to generate a key pair including a first public key and a first private key in advance;

a first acquisition unit configured to acquire identification information of the mobile terminal;

a first encryption unit configured to encrypt the key pair including the first public key and the first private key by using the identification information, to obtain a first encrypted public key and a first encrypted private key and save them;

a first decryption unit configured to decrypt the first encrypted private key by using the identification information, to obtain the first private key;

a second encryption unit configured to encrypt the service key by using the first private key, to obtain an encrypted service key;

a second decryption unit configured to decrypt the first encrypted public key by using the identification information, to obtain the first public key;

a third decryption unit configured to decrypt the encrypted service key by using the first public key, to obtain the service key;

a second acquisition unit configured to acquire data that needs to be encrypted/decrypted on the mobile terminal;

a third encryption unit configured to encrypt the data by using the service key; and a fourth decryption unit configured to decrypt the data by using the service key.

For example, the first decryption unit is further configured to:

generate a character string according to the identification information; and decrypt the first encrypted private key by using the character string.

For example, the second decryption unit is configured to:

generate a character string according to the identification information; and decrypt the first encrypted public key by using the character string.

For example, the generating the character string according to the identification information includes performing a hash algorithm processing on the identification information, to obtain the character string.

For example, the identification information comprises one or more of the following types:

an international mobile equipment identity;

an international mobile subscriber identification number, a media access control address; and a universally unique identifier of the mobile terminal.

The present disclosure also provides a method comprising:

generating a key pair including a first public key and a first private key in advance;

acquiring identification information of a mobile terminal; and encrypting the key pair including the first public key and the first private key by using the identification information to obtain a first encrypted public key and a first encrypted private key.

For example, the encrypting the key pair including the first public key and the first private key by using the identification information to obtain the first encrypted public key and the first encrypted private key includes:

generating a character string according to the identification information; and encrypting the key pair including the first public key and the first private key by using the character string to obtain the first encrypted public key and the first encrypted private key.

For example, the method further comprises saving the first encrypted public key and the first encrypted private key.

For example, the method further comprises:

generating a service key;

using the service key to encrypt data to obtain encrypted data

For example, the method further comprises decrypting the first encrypted private key by using the identification information to obtain the first private key.

For example, the decrypting the first encrypted private key by using the identification information to obtain the first private key includes:

generating a character string according to the identification information; and decrypting the first encrypted private key by using the character string.

For example, the method further comprises encrypting the service key by using the first private key, to obtain an encrypted service key.

For example, the method further comprises decrypting the first encrypted public key by using the identification information to obtain the first public key.

For example, the decrypting the first encrypted public key by using the identification information includes:

generating a character string according to the identification information; and decrypting the first encrypted public key by using the character string.

For example, the method further comprises decrypting an encrypted service key by using the first public key to obtain a service key.

For example, the method further comprises using the service key to decrypt encrypted data to obtain data.

For example, the generating the character string according to the identification information includes performing a hash algorithm processing on the identification information to obtain the character string.

For example, the identification information includes one or more of following types:

an international mobile equipment identity;

an international mobile subscriber identification number, a media access control address; and a universally unique identifier of the mobile terminal.

The present disclosure also provides an apparatus comprising:

one or more processors; and one or more memories stored thereon computer-readable instructions that, when executed by the one or more processors, cause the one or more processors to perform acts comprising:

generating a service key; and encrypting the service key, the encrypting the service key including:

generating a key pair including a first public key and a first private key in advance;

acquiring identification information of a mobile terminal;

encrypting the key pair including the first public key and the first private key by using the identification information to obtain a first encrypted public key and a first encrypted private key;

acquiring the identification information of the mobile terminal during encryption of the service key;

decrypting the first encrypted private key by using the identification information to obtain the first private key; and encrypting the service key by using the first private key, to obtain an encrypted service key.

For example, the acts further comprise:

acquiring data that needs to be encrypted on the mobile terminal; and encrypting the data by using the service key.

For example, the acts further comprising decrypting the service key, the decrypting the service key including:

decrypting the first encrypted public key by using the identification information to obtain the first public key; and decrypting the encrypted service key by using the first public key to obtain the service key.

For example, the acts further comprise decrypting the encrypted data by using the service key.

For example, the encrypting the key pair including the first public key and the first private key by using the identification information to obtain the first encrypted public key and the first encrypted private key includes:

generating a character string according to the identification information; and encrypting the first public key and the first private key separately by using the character string.

The present disclosure also provides one or more memories stored thereon computer-readable instructions that, when executed by one or more processors, cause the one or more processors to perform acts comprising:

generating a service key; and generating a key pair including a first public key and a first private key in advance;

acquiring identification information of the mobile terminal;

encrypting the key pair including the first public key and the first private key by using the identification information to obtain a first encrypted public key and a first encrypted private key and save them;

decrypting the first encrypted private key by using the identification information, to obtain the first private key;

encrypting the service key by using the first private key, to obtain an encrypted service key;

acquiring data that needs to be encrypted on the mobile terminal; and encrypting the data by using the service key For example, the acts further comprise:

decrypting the first encrypted public key by using the identification information, to obtain the first public key;

decrypting the encrypted service key by using the first public key, to obtain the service key; and decrypting the encrypted data by using the service key.

The method and apparatus for encrypting/decrypting data on a mobile terminal provided in the example embodiments of the present disclosure implements protection for private data on a mobile terminal by using processes of initialization, encryption, and decryption. Moreover, there is no need for hardware protection, data protection costs are low, and the data can be protected in an offline state, so that the data will not be stolen or tampered with.

DETAILED DESCRIPTION

To make the objectives, technical solutions, and advantages of the example embodiments of the present disclosure clearer, the technical solutions in the example embodiments of the present disclosure will be clearly and completely described below with reference to the accompanying drawings in the present disclosure. Apparently, the described example embodiments are merely some but not all of the example embodiments of the present disclosure. All other example embodiments obtained by those of ordinary skill in the art based on the example embodiments in the present disclosure without creative efforts fall in the protection scope of the present disclosure.

To facilitate comprehension of the example embodiments of the present disclosure, the following provides further detailed descriptions with reference to the accompanying drawings and specific example embodiments, and the example embodiments do not constitute a limit to the example embodiments of the present disclosure.

A method and an apparatus for encrypting/decrypting data on a mobile terminal provided in the example embodiments of the present disclosure are applicable to mobile terminals, such as a mobile phone and a tablet computer.

Figure 1:
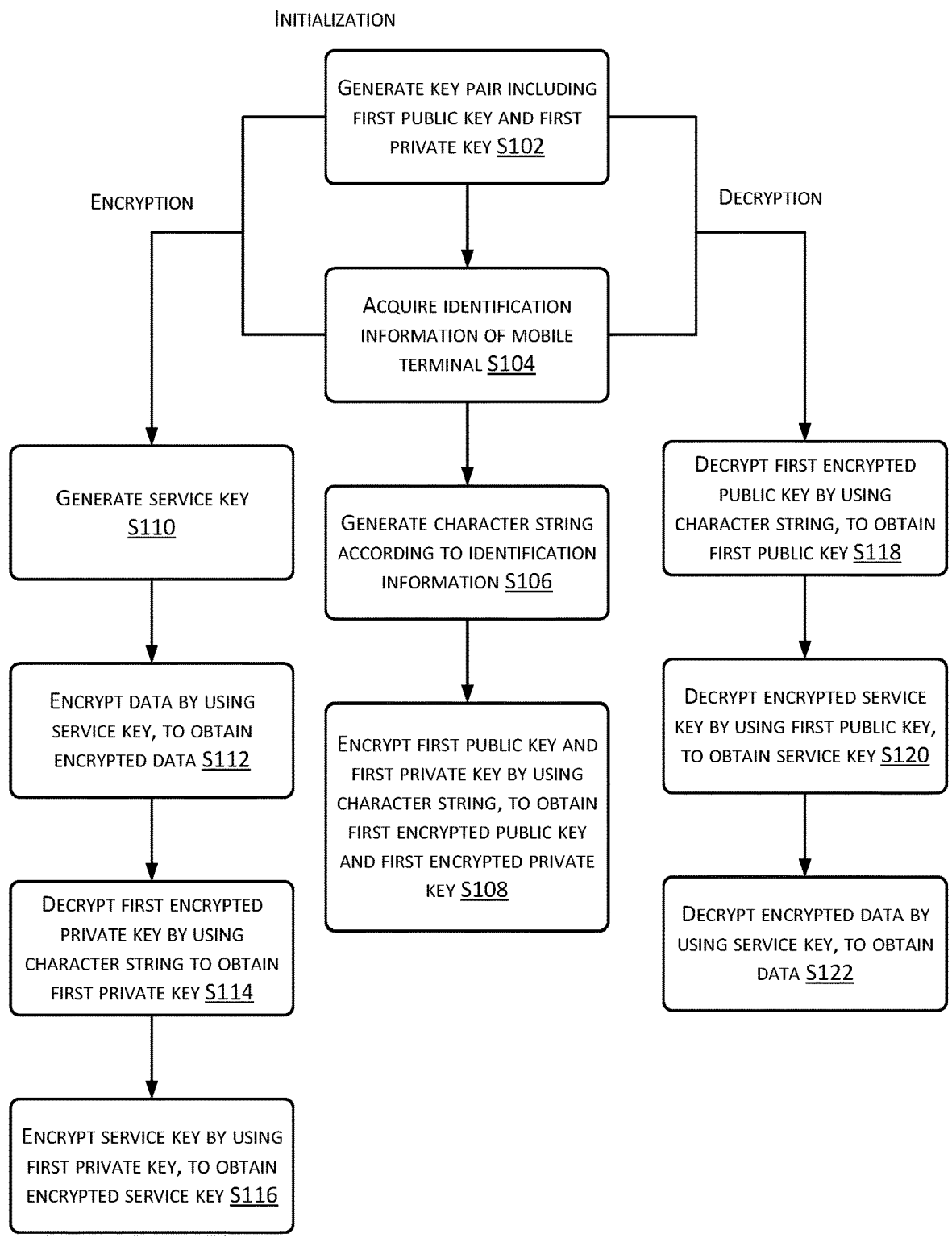
FIG. 1 is a flowchart of a method for encrypting/decrypting data on a mobile terminal according to an example embodiment of the present disclosure.

FIG. 1 is a flowchart of a method for encrypting/decrypting data on a mobile terminal according to an example embodiment of the present disclosure. Steps of the method are performed by a mobile terminal. As shown in FIG. 1, the method specifically includes:

S102: generating a key pair including a first public key and a first private key.

For example, the mobile terminal generates a key pair including a first public key and a first private key; a generation method belongs to the conventional techniques, and is not described in detail herein. The first public key and the first private key are generated simultaneously. Information encrypted with the first public key can only be decrypted with the first private key, and information encrypted with the first private key can only be decrypted with the first public key.

S104: acquiring identification information of the mobile terminal.

For example, the identification information of the mobile terminal is acquired by using a code.

The identification information includes one or more of the following types:

an International Mobile Equipment Identity (IMEI), an International Mobile Subscriber Identification Number (IMSI), a Media Access Control (MAC) address, and a Universally Unique Identifier (UUID) of the mobile terminal.

S106: generating a character string by using the identification information.

For example, hash algorithm processing is performed on the identification information, to obtain the character string.

A hash algorithm maps a binary value of any length into a shorter binary value with a fixed length, and this shorter binary value is referred to as a hash value. The hash value is a unique and extremely compact numeral expression form of a data segment. In hashing of a plain text, if only one letter of the paragraph is changed, a different hash value will be generated subsequently. It is impossible in calculation to find two different inputs that are hashed to a same value. Therefore, a hash value of data may be used to check the integrity of the data, and is generally used in quick search and encryption algorithms.

S108: encrypting the first public key and the first private key by using the character string, to obtain a first encrypted public key and a first encrypted private key.

For example, the first public key and the first private key are encrypted by using the character string and a symmetric encryption algorithm, to obtain the first encrypted public key and the first encrypted private key.

The encryption algorithm may be: an Advanced Encryption Standard (AES), a Data Encryption Standard (DES), a triple data encryption algorithm, and the like.

It should be noted that, the character string is a root key, and after being generated, is used for encrypting the first public key and the first private key. The root key is not saved, and is generated by using the identification information of the mobile terminal when needed.

The above is an initialization process. Each mobile terminal needs to be initialized once. Initialization is a prerequisite for encryption and decryption. The purpose of the initialization process is to obtain the first encrypted public key and the first encrypted private key.

S110: generating a service key.

For example, the service key is a service key randomly generated by the mobile terminal, and each service uses one service key. A method for generating the service key is the same as that for generating the key pair including the first public key and the first private key, and is not described in detail herein.

S112: encrypting data by using the service key, to obtain encrypted data.

For example, to-be-encrypted data on the mobile terminal is acquired, and the data is encrypted by using the service key and a symmetric encryption algorithm, to obtain the encrypted data, thus ensuring the security of the data. The data includes private data, such as a biological feature of a user.

S114: decrypting the first encrypted private key by using the character string, to obtain the first private key.

Before step S114, the root key is not saved; therefore, steps S104 and S106 need to be performed again, to obtain the character string.

The first encrypted private key is decrypted by using the character string and a symmetric decryption algorithm, to obtain the first private key.

S116: encrypting the service key by using the first private key, to obtain an encrypted service key.

For example, the service key is encrypted by using the first private key and an asymmetric algorithm, to obtain an encrypted service key.

The asymmetric algorithm may be: a public-key encryption algorithm (RSA), a Digital Signature Algorithm (DSA), and the like.

It should be noted that, steps S110 to S116 are an encryption process, which implements encryption of the private data, to prevent the private data from being stolen or tampered with. Moreover, the encrypted service key obtained in step S116 can be used for decrypting encrypted private data when private data is used.

S118: decrypting the first encrypted public key by using the character string, to obtain the first public key.

Before step S118, the root key is not saved; therefore, steps S104 and S106 need to be performed again, to obtain the character string.

The first encrypted public key is decrypted by using the character string and a symmetric decryption algorithm, to obtain the first public key.

S120: decrypting the encrypted service key by using the first public key, to obtain the service key.

For example, the encrypted service key is decrypted by using the first public key and an asymmetric decryption algorithm, to obtain the service key.

S122: decrypting the encrypted data by using the service key, to obtain the data.

For example, the encrypted private data is decrypted by using the service key and a symmetric decryption algorithm, to obtain the private data.

It should be noted that, steps S118 to S122 are a process of decrypting the encrypted data. The character string is generated according to the identifier of the device, and during decryption, the character string may be generated at any time according to the mobile phone device for decryption. Therefore, the encrypted private data can be decrypted in an offline state without accessing a server. Meanwhile, the character string is generated according to a local device for decryption, even if data leakage occurs, the data cannot be decrypted by others using other devices. Therefore, user privacy can be effectively protected from leakage.

The method for encrypting/decrypting data on a mobile terminal provided in the example embodiment of the present disclosure implements protection for private data on a mobile terminal by using processes of initialization, encryption, and decryption, wherein a root key is not saved; through information calculation by the mobile terminal, a public-private key pair ensures the security of a service key, and the service key protects the data. Hardware protection is not needed, data protection costs are low, and security of data can be ensured in an offline state, so that the data will not be stolen or tampered with.

Figure 2:
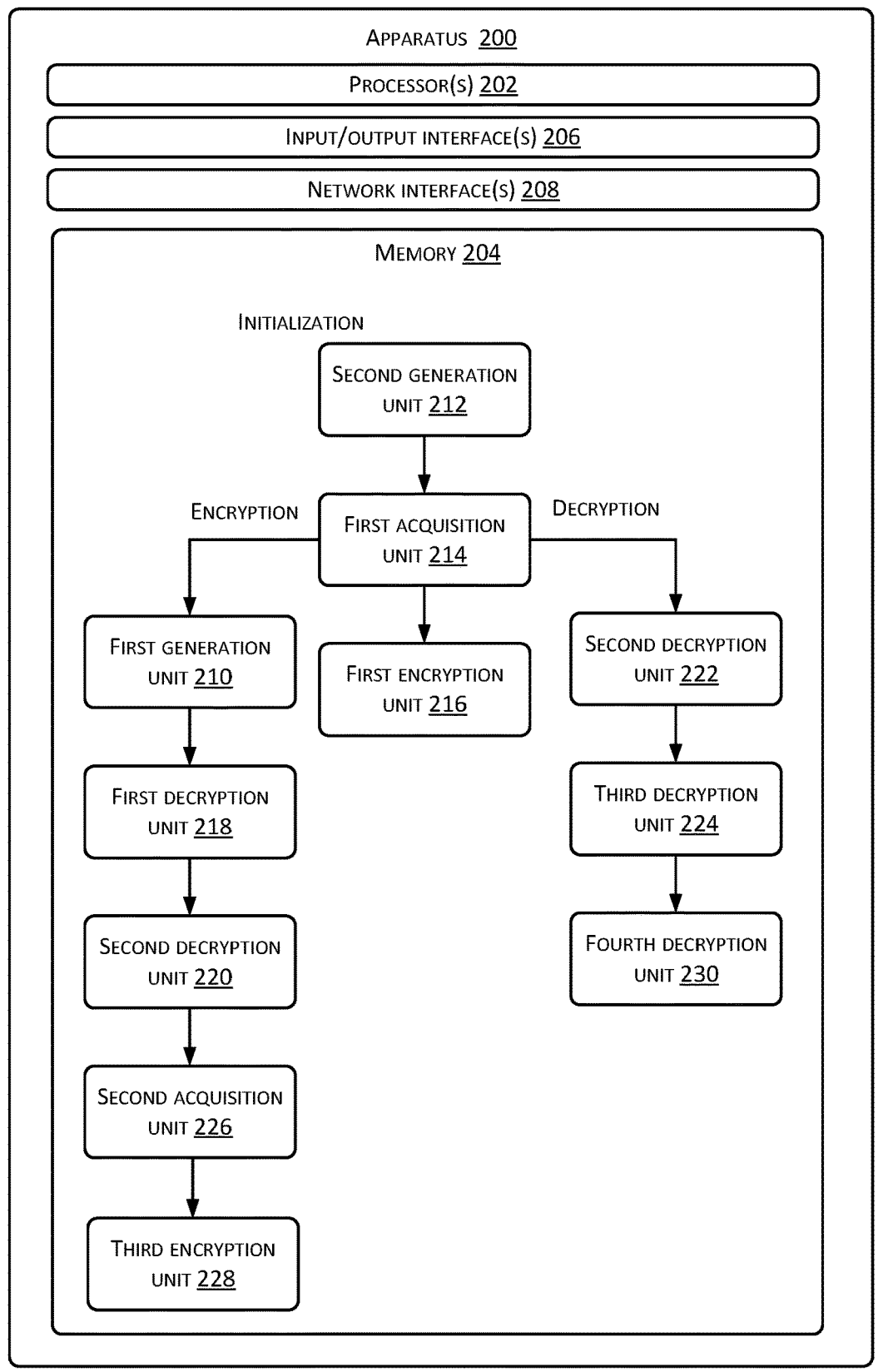
FIG. 2 is a schematic diagram of an apparatus for encrypting/decrypting data on a mobile terminal according to an example embodiment of the present disclosure.

Corresponding to the foregoing method for encrypting/decrypting data on a mobile terminal, an nd example embodiment of the present disclosure provides an apparatus for encrypting/decrypting data on a mobile terminal. FIG. 2 is a schematic diagram of an apparatus 200 for encrypting/decrypting data on a mobile terminal according to the example embodiment of the present disclosure. As shown in FIG. 2, the apparatus 200 includes one or more processor(s) 202 or data processing unit(s) and memory 204. The apparatus 200 may further include one or more input/output interface(s) 206, and network interface(s) 208.

The memory 204 may include computer readable media such as a volatile memory, a Random Access Memory (RAM), and/or a non-volatile memory, e.g., Read-Only Memory (ROM) or flash RAM, and so on. Computer readable media include permanent, non-permanent, mobile and non-mobile media, which can implement information storage through any method or technology. The information may be computer-readable instructions, data structures, program modules or other data. Examples of storage media of computers include, but are not limited to, a Phase-change RAM (PRAM), a Static RAM (SRAM), a Dynamic RAM (DRAM), other types of Random Access Memories (RAMs), a Read-Only Memory (ROM), an Electrically Erasable Programmable Read-Only Memory (EEPROM), a flash memory or other memory technologies, a Compact Disk Read-Only Memory (CD-ROM), a Digital Versatile Disc (DVD) or other optical memories, a cassette, a cassette and disk memory or other magnetic memory devices or any other non-transmission media, which can be used for storing information accessible to the computation device. According to the definitions herein, the computer readable media exclude transitory computer readable medium (transitory media), such as modulated data signals and carriers.

The memory 204 may store therein a plurality of modules or units including a first generation unit 210, a second generation unit 212, a first acquisition unit 214, a first encryption unit 216, a first decryption unit 218, a second encryption unit 220, a second decryption unit 222, a third decryption unit 224, a second acquisition unit 226, a third encryption unit 228, and a fourth decryption unit 230.

The first generation unit 210 is configured to generate a service key.

The second generation unit 212 is configured to generate a key pair including a first public key and a first private key in advance.

The first acquisition unit 214 is configured to acquire identification information of the mobile terminal.

The first encryption unit 216 is configured to encrypt the key pair including the first public key and the first private key by using the identification information, to obtain a first encrypted public key and a first encrypted private key and save them.

The first decryption unit 218 is configured to decrypt the first encrypted private key by using the identification information, to obtain the first private key.

The second encryption unit 220 is configured to encrypt the service key by using the first private key, to obtain an encrypted service key.

The second decryption unit 222 is configured to decrypt the first encrypted public key by using the identification information, to obtain the first public key.

The third decryption unit 224 is configured to decrypt the encrypted service key by using the first public key, to obtain the service key.

The second acquisition unit 226 is configured to acquire data that needs to be encrypted/decrypted on the mobile terminal.

The third encryption unit 228 is configured to encrypt the data by using the service key.

The fourth decryption unit 230 is configured to decrypt the data by using the service key.

Optionally, the first encryption unit 216 is specifically configured to:

generate a character string according to the identification information; and encrypt the first public key and the first private key separately by using the character string.

Optionally, the first decryption unit 218 is specifically configured to:

generate a character string according to the identification information; and decrypt the first encrypted private key by using the character string.

Optionally, the second decryption unit 222 is specifically configured to:

generate a character string according to the identification information; and decrypt the first encrypted public key by using the character string.

Optionally, the generating a character string according to the identification information includes:

performing hash algorithm processing on the identification information, to obtain the character string.

Optionally, the identification information includes one or more of the following types:

an International Mobile Equipment Identity (IMEI), an International Mobile Subscriber Identification Number (IMSI), a Media Access Control (MAC) address, and a Universally Unique Identifier (UUID) of the mobile terminal.

The method provided in the first example embodiment of the present disclosure is implanted in the apparatus provided in the example embodiment of the present disclosure. Therefore, a specific working process of the apparatus provided in the present disclosure is not described in detail herein again.

The apparatus for encrypting/decrypting data on a mobile terminal provided in the example embodiment of the present disclosure implements protection for private data on a mobile terminal by using processes of initialization, encryption, and decryption, wherein a root key is not saved; through information calculation by the mobile terminal, a public-private key pair ensures the security of a service key, and the service key protects the data. Hardware protection is not needed, data protection costs are low, and security of data can be ensured in an offline state, so that the data will not be stolen or tampered with.

Those of ordinary skill in the art should also be aware that objects and algorithm steps in examples described with reference to the example embodiments disclosed herein can be implemented by electronic hardware, computer software, or a combination thereof. To clearly illustrate the interchangeability between hardware and software, the composition and steps of each example have been described in general according to functions in the foregoing description. Whether these functions are executed by using hardware or software depends on a specific application and design constraint conditions of the technical solution. For each specific application, professionals may use a different method to implement the described functions. However, such implementation should not be considered as exceeding the scope of the present disclosure.

Steps of the method or algorithm described with reference to the example embodiments disclosed herein may be implemented by hardware, a software module executed by a processor, or a combination thereof. The software module may be disposed in a random access memory (RAM), a memory, a read-only memory (ROM), an electrically programmable ROM, an electrically erasable programmable ROM, a register, a hard drive, a removable disk, a CD-ROM, or any other form of storage medium commonly known in the technical field.

The foregoing specific implementations provide further detailed description of the objectives, technical solutions, and beneficial effects of the present disclosure. It should be understood that, described above are merely specific implementations of the present disclosure, which are not intended to limit the protection scope of the present disclosure. Any modification, equivalent replacement, improvement, and the like made within the spirit and principle of the present disclosure shall all be included in the protection scope of the present disclosure.

What is claimed is:

1. A method for improving security of data on a mobile terminal in an off-line state, the method comprising:

generating, by a first generation unit of the mobile terminal, a service key;

encrypting, by a second encryption unit of the mobile terminal, the service key, wherein encrypting the service key includes:

generating, by a second generation unit of the mobile terminal, a key pair including a first public key and a first private key;

acquiring, by a first acquisition unit of the mobile terminal, identification information of the mobile terminal;

encrypting, by a first encryption unit of the mobile terminal, the key pair including the first public key and the first private key by using the identification information of the mobile terminal to obtain a first encrypted public key and a first encrypted private key, wherein the encrypting by the first encryption unit of the mobile terminal the key pair including the first public key and the first private key by using the identification information of the mobile terminal to obtain the first encrypted public key and the first encrypted private key includes:

storing, by the first encryption unit of the mobile terminal, the key pair including the first public key and the first private key;

generating a first character string according to the identification information of the mobile terminal, wherein generating the first character string according to the identification information of the mobile terminal includes performing a hash algorithm processing on the identification information of the mobile terminal, to obtain the first character string; and encrypting, by the first encryption unit of the mobile terminal, the key pair including the first public key and the first private key by using the first character string to obtain the first encrypted public key and the first encrypted private key;

decrypting, by a first decryption unit of the mobile terminal, the first encrypted private key by using the identification information of the mobile terminal to obtain the first private key, wherein the decrypting the first encrypted private key by using the identification information of the mobile terminal to obtain the first private key includes:
  generating a second character string according to the identification information of the mobile terminal; and
  decrypting the first encrypted private key by using the second character string;
encrypting, by the second encryption unit of the mobile terminal, the service key by using the first private key, to obtain an encrypted service key;
decrypting, by a second decryption unit of the mobile terminal, the first encrypted public key by using the identification information of the mobile terminal to obtain the first public key, wherein the decrypting the first encrypted public key by using the identification information of the mobile terminal includes:
  generating a third character string according to the identification information of the mobile terminal; and
  decrypting the first encrypted public key by using the third character string;
decrypting by a third decryption unit of the mobile terminal the encrypted service key by using the first public key to obtain the service key;
acquiring, by a second acquisition unit of the mobile terminal, data that needs to be encrypted on the mobile terminal;
encrypting, by a third encryption unit of the mobile terminal, the data using the service key to obtain encrypted data; and
decrypting, by a fourth decryption unit of the mobile terminal, the encrypted data using the service key in an offline state without accessing a server to obtain data.

2. The method of claim 1, wherein the identification information of the mobile terminal includes one or more of following types:
an international mobile equipment identity;
an international mobile subscriber identification number,
a media access control address; and
a universally unique identifier of the mobile terminal.

3. An apparatus for improving security of data on a mobile terminal in an off-line state, the apparatus comprising:
one or more processors; and
one or more memories stored thereon computer-readable instructions that, when executed by the one or more processors, cause the one or more processors to perform acts comprising:
  generating, by a first generation unit of the mobile terminal, a service key; and
  encrypting, by a second encryption unit of the mobile terminal, the service key, wherein encrypting the service key includes:
    generating, by a second generation unit of the mobile terminal, a key pair including a first public key and a first private key;
    acquiring, by a first acquisition unit of the mobile terminal, identification information of the mobile terminal;
    encrypting, by a first encryption unit of the mobile terminal, the key pair including the first public key and the first private key by using the identification information of the mobile terminal to obtain a first encrypted public key and a first encrypted private key, wherein the encrypting by the first encryption unit of the mobile terminal the key pair including the first public key and the first private key by using the identification information of the mobile terminal to obtain the first encrypted public key and the first encrypted private key includes:
      storing, by the first encryption unit of the mobile terminal, the key pair including the first public key and the first private key;
      generating a first character string according to the identification information of the mobile terminal, wherein generating the first character string according to the identification information of the mobile terminal includes performing a hash algorithm processing on the identification information of the mobile terminal, to obtain the first character string; and
      encrypting, by the first encryption unit of the mobile terminal, the first public key and the first private key separately by using the first character string to obtain the first encrypted public key and the first encrypted private key;
    decrypting, by a first decryption unit of the mobile terminal, the first encrypted private key by using the identification information of the mobile terminal to obtain the first private key, wherein the decrypting the first encrypted private key by using the identification information of the mobile terminal to obtain the first private key includes:
      generating a second character string according to the identification information of the mobile terminal; and
      decrypting the first encrypted private key by using the second character string;
    encrypting, by the second encryption unit of the mobile terminal, the service key by using the first private key, to obtain an encrypted service key;
    decrypting, by a second decryption unit of the mobile terminal, the first encrypted public key by using the identification information of the mobile terminal to obtain the first public key, wherein the decrypting the first encrypted public key by using the identification information of the mobile terminal includes;
      generating a third character string according to the identification information of the mobile terminal; and
      decrypting the first encrypted public key by using the third character string;
    decrypting by a third decryption unit of the mobile terminal the encrypted service key by using the first public key to obtain the service key;
    acquiring, by a second acquisition unit of the mobile terminal, data that needs to be encrypted on the mobile terminal;
    encrypting, by a third encryption unit of the mobile terminal, the data by using the service key to obtain encrypted data; and
    decrypting, by a fourth decryption unit of the mobile terminal, the encrypted data by using the service key in an offline state without accessing a server.

4. One or more memories stored thereon computer-readable instructions that, when executed by one or more processors, cause the one or more processors to perform acts comprising:
generating, by a first generation unit of the mobile terminal, a service key;
encrypting, by a second encryption unit of the mobile terminal, the service key, wherein encrypting the service key includes:

generating, by a second generation unit of the mobile terminal, a key pair including a first public key and a first private key;

acquiring, by a first acquisition unit of a mobile terminal, identification information of the mobile terminal;

encrypting, by a first encryption unit of the mobile terminal, the key pair including the first public key and the first private key by using the identification information of the mobile terminal to obtain a first encrypted public key and a first encrypted private key and save the first encrypted public key and the first encrypted private key, wherein the encrypting by the first encryption unit of the mobile terminal the key pair including the first public key and the first private key by using the identification information of the mobile terminal to obtain the first encrypted public key and the first encrypted private key includes:

storing, by the first encryption unit of the mobile terminal, the key pair including the first public key and the first private key;

generating a first character string according to the identification information of the mobile terminal, wherein generating the first character string according to the identification information of the mobile terminal includes performing a hash algorithm processing on the identification information of the mobile terminal, to obtain the first character string; and encrypting, by the first encryption unit of the mobile terminal, the key pair including the first public key and the first private key by using the first character string to obtain the first encrypted public key and the first encrypted private key;

decrypting, by a first decryption unit of the mobile terminal, the first encrypted private key by using the identification information of the mobile terminal, to obtain the first private key, wherein the decrypting the first encrypted private key by using the identification information of the mobile terminal to obtain the first private key includes:

generating a second character string according to the identification information of the mobile terminal; and decrypting the first encrypted private key by using the second character string;

encrypting, by the second encryption unit of the mobile terminal, the service key by using the first private key, to obtain an encrypted service key;

decrypting, by a second decryption unit of the mobile terminal, the first encrypted public key by using the identification information of the mobile terminal to obtain the first public key, wherein the decrypting the first encrypted public key by using the identification information of the mobile terminal includes:

generating a third character string according to the identification information of the mobile terminal; and decrypting the first encrypted public key by using the third character string;

decrypting by a third decryption unit of the mobile terminal the encrypted service key by using the first public key to obtain the service key;

acquiring, by a second acquisition unit of the mobile terminal, data that needs to be encrypted on the mobile terminal;

encrypting, by a third encryption unit of the mobile terminal, the data by using the service key; and decrypting, by a fourth decryption unit of the mobile terminal, the encrypted data by using the service key in an offline state without accessing a server.

* * * * *